Figure 1:
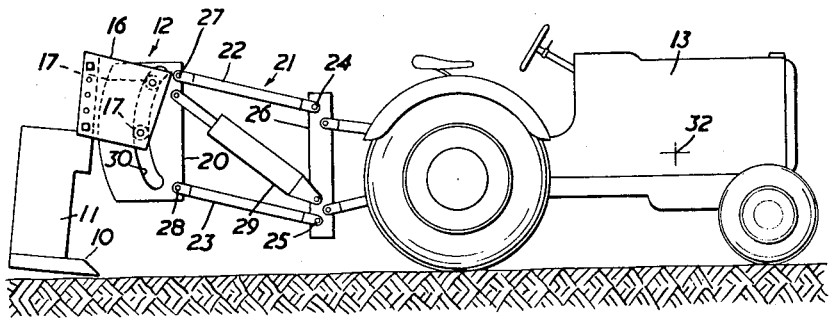

INVENTOR
AINSLEY NEVILLE EDE,

United States Patent Office 3,032,903
Patented May 8, 1962

3,032,903
MOLE PLOW SUPPORTING MEANS
Ainsley Neville Ede, Cambridge, England, assignor to National Research Development Corporation, London, England, a British corporation
Filed Jan. 20, 1959, Ser. No. 787,860
13 Claims. (Cl. 37—193)

This invention relates to a supporting linkage for a mole plow, of the type in which a bullet or mole is rigidly secured to the lower end of an upwardly extending coulter whose upper end is secured to the supporting linkage attached to a suitable part of a vehicle, such as a tractor or trailer, the forward movement of which forces the mole through the ground in the forward direction. The invention is concerned with providing an improved form of supporting means which will enable the mole to operate in floating equilibrium at a substantial constant but adjustable equilibrium depth relative to the vehicle, and which will simulate the action of a long rigid towbar, perhaps 12 feet long, rigidly secured at its rear end to the top of the coulter and pivoted at its front end to the towing vehicle, without the inconvenience liable to arise in the handling of such a lengthy and cumbersome tow-bar for example in confined spaces.

According to the present invention, a mole plow supporting linkage comprises a pair of interconnected supporting members one adapted to be carried by the towing vehicle and the other constituted by the upper end of the coulter or a member secured thereto, the two members being movable relatively to one another in a normally vertical plane lying parallel to the axis of the mole under the control of constraining means which comprises a curved track afforded by one of the supporting members and lying in the vertical plane and follower means secured to the other member and constrained to follow the track, the center or centers of curvature of the track, or at least of the intermediate part thereof, lying ahead of the foremost part of the supporting linkage, and relative movement between the two members being thus constrained to take place by rotation about the center of curvature of that part of the track on which the follower means lies.

The track may be a curved slot formed in one supporting member whilst the follower means may take the form of a pair of spaced rollers pivoted to the other supporting member and engaged in the slot.

Thus the linkage affords substantially the towing characteristics of a straight elongated towbar, the center of curvature of the track corresponding to the pivot of the towbar and the radius of curvature of the track corresponding to the equivalent length of the towbar. Moreover since the center of curvature of the track is a virtual center, it can be arranged to lie at the desired distance ahead of the mole plow even though the connecting linkage itself is quite short. Thus the center of curvature of the track may be situated between the axles of the towing vehicle where it will be least subject to variation in height due to pitching of the vehicle on undulating ground.

The intermediate part of the curved track, which is engaged by the follower means during normal operation when the mole is travelling in equilibrium at the desired depth, may be of greater radius of curvature than the extreme end portions of the track.

In addition, the supporting member carried by the towing vehicle may be mounted on means capable of adjustment to vary the height of the said supporting member relative to the vehicle. For example the said supporting member may be carried by a parallel motion linkage mounted on the vehicle and provided with means such as a hydraulic ram for varying the length of a diagonal of the linkage in either direction so as to raise or lower the said supporting member whilst retaining it in the same angular orientation relatively to the vehicle.

Figure 2:
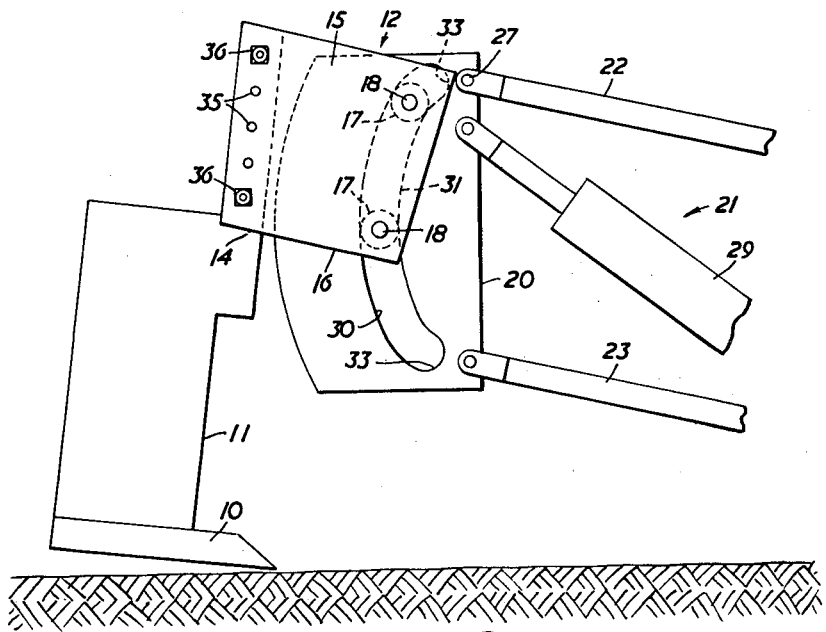
Figure 3:
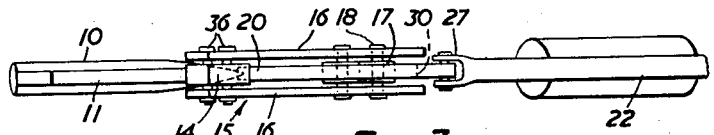
Figure 4:
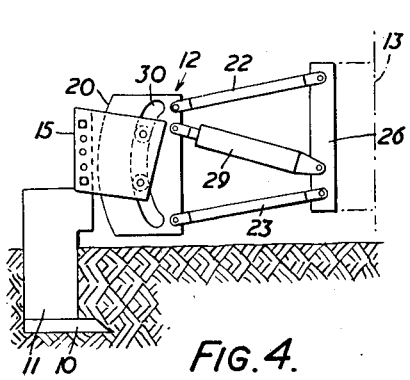

The invention may be carried into practice in various ways but one specific embodiment will now be described by way of example with reference to the accompanying drawings, in which FIGURE 1 is a side elevation of a tractor carrying a mole plow by means of a supporting structure mounted at the rear of the tractor, FIGURE 2 is a fragmentary side view on an enlarged scale showing part of the supporting structure for the mole plow, FIGURE 3 is a plan of the supporting structure assembly of FIGURE 2, FIGURE 4 is a side view on a smaller scale of the mole plow and its supporting structure, showing the mole plow running at a constant level.

Figure 5:
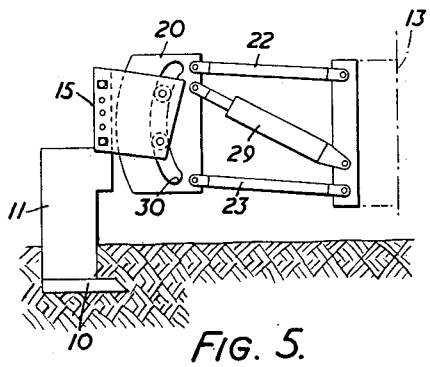
Figure 6:
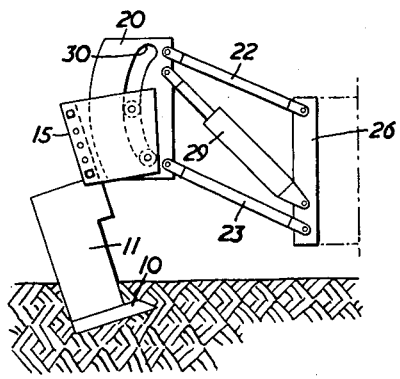
Figure 8:
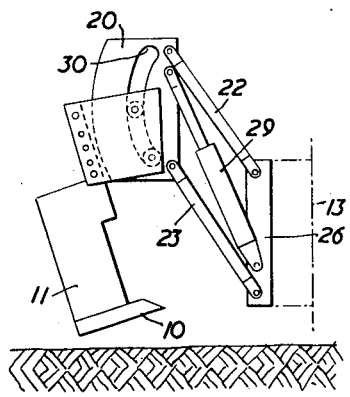
Figure 7:
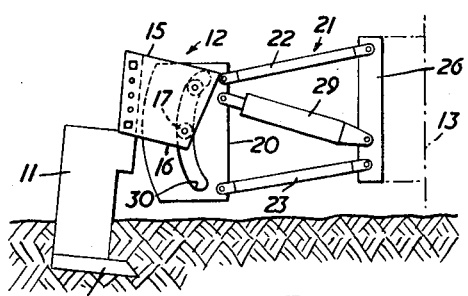
Figure 9:
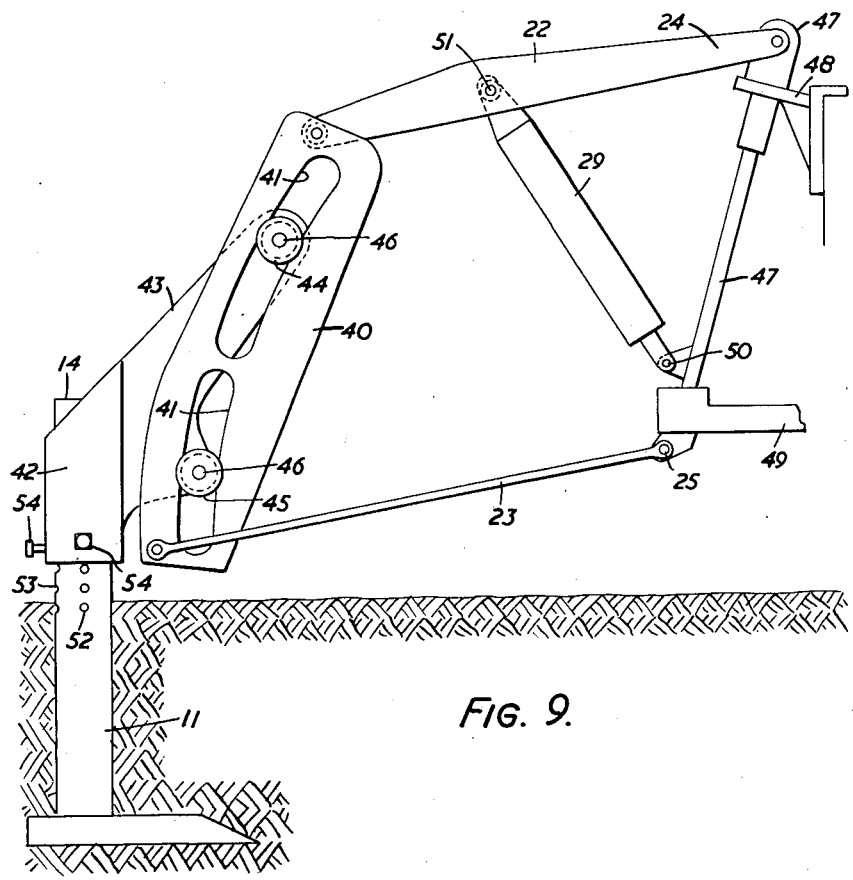
Figure 10:
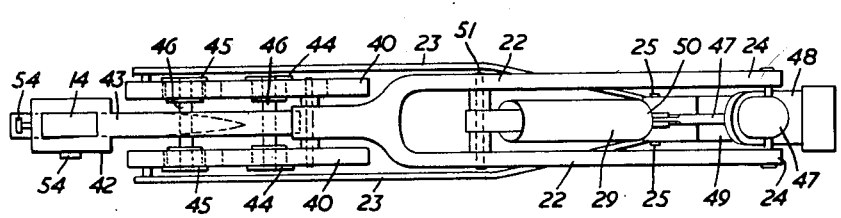

FIGURE 5 is a view similar to FIGURE 4 but with the mole plow running at a shallower constant level, FIGURE 6 is a view similar to FIGURE 4 but showing the mole plow up-tilted for exit, FIGURE 7 is a view similar to FIGURE 6 but with the mole plow entering the soil, FIGURE 8 is a view similar to FIGURE 7 but showing the mole plow raised for transport, FIGURE 9 is a side view of a modified arrangement, and FIGURE 10 is a plan of the structure shown in FIGURE 9.

In the illustrated embodiment a mole plow 10 rigidly secured to the foot of a rigid coulter 11 is carried by means of a supporting structure generally indicated at 12 at the rear of a tractor 13. The coulter 11 comprises a plate of stepped form whose upper end 14 is rigidly secured to a coulter box 15 afforded by a pair of spaced plates 16 secured together by means of transverse bolts and spacers. Two follower rollers 17, spaced apart one above the other, are pivotally mounted between the plates 16 on shafts 18 extending transversely between the plates.

A guide member comprising a single plate 20 is mounted on the trailing end of a parallel-motion quadrilateral linkage 21, comprising a pair of equal and parallel rigid links 22 and 23 whose leading ends 24 and 25 are pivoted to a vertical supporting plate 26 mounted on the drawbar of the tractor 13, and whose trailing ends 27 and 28 are pivoted to the guide member 20, so that the guide member 20 is maintained in a fixed angular orientation relatively to the supporting plate 26 but can be raised and lowered in a vertical plane. A hydraulic ram 29 extends diagonally across the quadrilateral linkage 21 and can be actuated to vary the length of the diagonal of the linkage and thus to raise or lower the guide member 20 relatively to the tractor 13, or the guide member 20 may be raised or lowered relative to the tractor 13 using the conventional power lift where incorporated on the tractor.

The guide member 20 is formed with an upwardly extending elongated curved slot 30, and the two spaced plates 16 of the coulter box 15 lie one on each side of the guide member 20 with the follower rollers 17 engaged in the curved slot 30, whose width is just a little greater than the diameters of the rollers 17. The central portion 31 of the curved slot has parallel sides both of which are arcuate and coaxial, their common center of curvature lying at a point 32 (FIGURE 1) at a suitable distance in front of the mole 10, for example four times the desired mean working depth. The two end portions 33 of the curved slot 30 are however of greater curvature than the central portion 31, having a much shorter radius of curvature, and serving for effecting the rapid entry of the mole 10 into and extraction from the ground. Entry or extraction may be assisted by the reaction transmitted from the ram 29 bearing on one or pairs of rollers 17 when in the extreme position in the guide slots 30.

The operation of the apparatus is as follows. When the mole 10 is being towed at the desired depth by the forward movement of the tractor 13, as indicated in FIGURE 4, the hydraulic ram 29 holds the guide member 20 stationary relatively to the tractor 13 so that it follows any vertical movement of the tractor due to irregularities in the ground. The mole 10 will then be controlled by the movements of the coulter box 15 rolling along the central portion 31 of the curved slot 30, and thereby simulating the effect of a long rigid towbar of length equal to the radius of curvature of the central part 31 of the slot 30 and pivoted at its leading end about a horizontal towing axis through the center of curvature 32 of the slot 30. The mole 10 will be towed in floating equilibrium following the movements of the horizontal towing axis referred to, at a more-or less constant depth depending on the height of that axis. To vary the depth at which the mole 10 will operate, the guide member 20 can be raised or lowered by means of the hydraulic ram 29 without disturbing its angular orientation, and this will have the effect of correspondingly raising or lowering the center of curvature 32 of the arcuate central portion 31 of the slot 30 about which point the mole 10 and coulter box 15 rotate, and thus to alter the equilibrium depth at which the mole will tend to run. FIGURE 5 shows the guide member 20 raised to cause the mole 10 to run at a shallower depth.

For extracting the mole 10 from the ground, the guide member is raised by the ram 29 to its extreme position, as shown in FIGURE 6, forcing the rollers 17 into the lower end portion 33 of the curved slot 30 and thereby sharply tilting the mole 10 in the upward direction so that the mole will start to climb. Moreover the lower roller 17 will now be operating in the more acutely curved lower end portion 33 of the slot so that the instantaneous center about which the mole 10 will be operating will be nearer to the mole than the center 32, corresponding to a shorter towbar drawn from a higher point, and this will assist in extracting the mole rapidly from the ground.

Similarly, for introducing the mole into the ground the guide member 20 is lowered to its lowest position as shown in FIGURE 1 so that, with the mole 10 resting on the ground, the follower rollers 17 will be in the extreme upper end portion 33 of the slot 30, with the mole 10 tilted downward for rapid entry. As the mole 10 bites into the ground, the guide member 20 is slowly lowered by the ram 29 and the rollers 17 continue to act in the upper end portion 33 of the slot 30, as shown in FIGURE 7, giving a towing action corresponding to that of a short towbar drawn from a low point to accentuate the steepness of the plunging of the mole 10 down to its equilibrium depth.

For transport the mole can be carried in the raised position above the ground as shown in FIGURE 8, the guide member 20 being raised to its extreme upper position by means of the hydraulic ram 29, and the coulter 11 and mole 10 hanging from it above ground level.

The coulter box 15 is provided with a row of registering pairs of holes 35 near the rear edges of the plates 16, by means of which the height of the coulter can be adjusted. The upper part 14 of the coulter is formed as an upright bar which can be secured in a desired position by means of bolts 36 which are inserted through selected pairs of the holes 35 and are tightened up to lock the coulter rigidly to the box 15.

In the arrangement shown in FIGURE 9 and FIGURE 10 the same reference numerals are used for the same parts as those shown on the other figures. The guide member 20 in this case however is replaced by a pair of spaced parallel plates 40 in each of which are formed a pair of curved slots 41. The upper end 14 of the coulter 11 is secured to a modified coulter box 42 from which projects a vertically extending coulter support in the form of a plate 43 and upper and lower pairs of follower rollers 44, 45 spaced apart one above the other, are pivotally mounted on shafts 46 extending transversely through the support 43 one of each pair of rollers on either side thereof. The plate 43 extends upwardly between the spaced parallel plates 40 with the upper follower rollers 44 engaging the upper curved slots, and the lower follower rollers 45 engaging the lower curved slots 41.

In this embodiment the upper and lower parallel links 22 and 23 are duplicated as is clearly shown in FIGURE 10 and the leading ends 24 and 25 are pivotally connected to a vertical supporting spindle 47 which is rotatably mounted in upper and lower supporting brackets 48, 49 secured to the tractor. The ram 29 is also connected at 50 to the spindle 47 and to the upper pair of parallel links 22 at 51. The arrangement is such that the apparatus can swing in an approximately horizontal plane about an approximately vertical or steeply inclined axis behind the towing vehicle thus avoiding side-reactions on the structure when turning or slewing.

As in the previously described arrangement the height of the coulter can be adjusted, in this instance by a row of vertically spaced holes 52 and notches 53 provided in the upper end 14 of the coulter, co-operating bolts 54 passing through holes in the coulter box 15.

This arrangement works in a similar manner to that already described, but the portions of the slot 41 of more acute curvature are omitted as it has been found that the mole can be quickly removed from the ground with this construction without using them.

What I claim as my invention and desire to secure by Letters Patent is:

1. A mole plow assembly comprising a mole having a longitudinal axis, an upwardly extending coulter having an upper end and having a lower end, the mole being rigidly secured to the lower end of the coulter transversely thereto and a towing linkage secured to the coulter for towing the mole longitudinally through the ground in a forward direction; the towing linkage comprising a pair of mechanically interconnected supporting members, mounting means secured to one of the supporting members for mounting it detachably on a towing vehicle, the other supporting member being rigidly secured to the upper end of the coulter, and in which the mechanical interconnection between the two supporting members comprises a concavely curved arcuate track formed on one member, the track extending in a vertical plane parallel to the axis of the mole and facing forwardly in the towing direction, and follower means on the other member, the follower means being free to move tangentially along said track and being held in radial engagement with said track at two spaced points of contact, and the curvature of said track being such that radial lines extending normally to the track at the two points of contact will always intersect at a center of rotation lying ahead of the mole and above its longitudinal axis, and lying ahead of both said supporting members, and in which the said mechanical interconnection permits the mole and coulter to rise and fall freely and to move into an equilibrium position under the influence of the forces imposed on them during the towing operation, but constrains them during such vertical movement to rotate about the said center of rotation.

2. An assembly as claimed in claim 1 in which the curved track includes an intermediate arcuate portion which is of greater radius of curvature than the extreme end portions of the track.

3. An assembly as claimed in claim 1 in which the track comprises a curved arcuate slot formed in one supporting member, and in which the follower means comprises a pair of rollers journalled to the other supporting member at spaced points thereof and engaged in the slot.

4. An assembly as claimed in claim 1 in which the said mounting means is capable of vertical adjustment to vary the height of the associated supporting member relatively to the towing vehicle.

5. An assembly as claimed in claim 4 in which the said mounting means comprises a parallel motion linkage secured to the said supporting member and provided with means for varying the length of a diagonal of the parallel motion linkage and holding it at a desired setting.

6. An assembly as claimed in claim 5 in which the said diagonal varying means comprises a power-driven telescopic ram connected between diagonally-opposite corners of the parallel motion linkage.

7. An assembly as claimed in claim 1 in which the supporting member which is secured to the said mounting means comprises at least one plate formed with a curved slot constituting the said track, and in which the follower means comprises spaced rollers journalled on the other supporting member and engaged in the slot.

8. An assembly as claimed in claim 7 in which the supporting member to which the coulter is secured comprises a pair of spaced parallel plates rigidly secured together by spacers, the rollers being journalled between the parallel plates, and in which the slotted plate lies between the said parallel plates.

9. An assembly as claimed in claim 1 in which the upper end of the coulter is rigidly secured at an adjustable height to the associated supporting members.

10. An assembly as claimed in claim 1 in which the said mounting means is pivotally secured to the vehicle by means of a hinge having a vertical axis.

11. An assembly as claimed in claim 1 in which the supporting member which is secured to the said mounting means comprises a pair of spaced parallel plates in each of which are formed a pair of longitudinally-aligned curved slots, and in which the follower means comprises two pairs of spaced rollers journalled on the other supporting member, one roller being engaged in each of the slots.

12. An assembly as claimed in claim 11 in which the supporting member to which the coulter is secured comprises a plate on which the said two pairs of spaced rollers are journalled and which lies between the said parallel plates.

13. A mole plow assembly comprising a mole having a longitudinal tunnelling axis and an upwardly extending coulter to whose lower end the mole is rigidly secured transversely to the coulter, and towing linkage by which the coulter is secured to the vehicle at at least one towing point for towing the mole longitudinally through the ground in a forward towing direction, in which the mole and coulter are free to rise and fall relatively to the towing vehicle and to move into an equilibrium position under the influence of the forces acting on them during towing, but are constrained to a predetermined orientation dependent on their level relative to the vehicle, the mole and coulter being constrained by the towing linkage to rotate about a center ahead of the said towing point during their said rising and falling movement.

References Cited in the file of this patent

UNITED STATES PATENTS

| | | |
|---|---|---|
| 544,850 | Hoefs | Aug. 20, 1895 |
| 1,940,061 | Paul | Dec. 19, 1933 |
| 2,227,366 | Pridgen | Dec. 31, 1940 |
| 2,410,508 | Lamme | Nov. 5, 1946 |
| 2,806,682 | Ankersheil | Sept. 17, 1957 |
| 2,826,130 | Collins | Mar. 11, 1958 |

FOREIGN PATENTS

| | | |
|---|---|---|
| 497,155 | Germany | May 3, 1930 |
| 510,632 | Germany | Oct. 21, 1930 |
| 950,245 | Germany | Oct. 4, 1956 |
| 167,889 | Great Britain | Aug. 25, 1921 |